(12) United States Patent
Mann

(10) Patent No.: US 6,720,532 B1
(45) Date of Patent: Apr. 13, 2004

(54) ELECTRICALLY CONTROLLED CORN POPPER APPARATUS

(76) Inventor: Gary A. Mann, P.O. Box 1596, Cody, WY (US) 82414

( * ) Notice: Subject to any disclaimer, the term of this patent is extended or adjusted under 35 U.S.C. 154(b) by 0 days.

(21) Appl. No.: 10/274,527

(22) Filed: Oct. 21, 2002

(51) Int. Cl.[7] .................................................. A23L 1/18
(52) U.S. Cl. ...................... 219/432; 219/436; 99/323.5; 99/323.9
(58) Field of Search ................................. 219/429, 430, 219/432, 438, 439, 436; 99/323.5, 323.9

(56) References Cited

U.S. PATENT DOCUMENTS

| | | | | |
|---|---|---|---|---|
| 2,117,872 A | * | 5/1938 | Barnard | 99/323.5 |
| 2,150,888 A | * | 3/1939 | Barnard | 219/436 |
| 4,052,590 A | * | 10/1977 | Anderl et al. | 219/438 |
| 4,270,067 A | * | 5/1981 | Thomas et al. | 219/438 |
| 4,649,263 A | * | 3/1987 | Goodlaxson | 219/438 |
| 5,787,798 A | * | 8/1998 | Stein et al. | 99/323.9 |
| 5,857,403 A | * | 1/1999 | Mann | 99/323.9 |
| 6,032,572 A | * | 3/2000 | Mann | 99/323.9 |
| 6,082,248 A | * | 7/2000 | Turrel | 99/323.9 |
| 6,374,727 B1 | * | 4/2002 | Cretors | 99/323.9 |

* cited by examiner

Primary Examiner—Joseph Pelham
(74) Attorney, Agent, or Firm—Charles I. Brodsky

(57) ABSTRACT

A corn popping apparatus including an electrically energized heat source contiguous along an underside of a tiltable corn popping kettle projecting into a cabinet enclosure for the kettle when its lid panel closes its open top.

6 Claims, 3 Drawing Sheets

ELECTRICALLY CONTROLLED CORN POPPER APPARATUS

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the preparation of a popped corn snack food popularly referred to as "kettle corn", in general, and to the commercial vending of kettle corn, in particular.

2. Description of the Related Art

My two U.S. Pat. Nos. 5,857,403 and 6,032,572 describe a kettle corn popping structure especially useful by kettle corn vendors at such outdoor events as pioneer festivals, community commemorative events, fairs, markets, exhibitions of antiquated crafts and varieties of outdoor sports events. The corn popping apparatus there described structurally included a large popping kettle, a kettle support cabinet and a popped corn receiving-holding receptacle operable to permit the commercial vendor to prepare the popped corn, to dump the contents of its kettle into a suitable receptacle disposed outside the cabinet, and to be able to move the cabinet from one popping site to another with a substantial degree of mobility for such a relatively heavy structural combination. An improved process was also set forth to allow for producing and vending large quantities of the freshly prepared popped corn, while reducing to a minimum the hazards and discomforts which previously attended the preparation of popped corn over an open flame. The structure set out enabled the preparer to tilt the popping kettle for dumping its contents very quickly and with very little physical effort, in a manner which was practical and efficient in its use and operation, while at the same time being of a simple yet rugged construction, which could be manufactured at reasonably low cost. With the attendant savings being thus able to be passed on to a purchasing consumer, there typically began being formed long lines of the buying public to purchase the popped kettle corn at these outdoor events.

As will be understood, the kettle corn popping structures—as well as others commonly employed at such outdoor locations—typically operate from such fuels as pressurized propane, gasoline or kerosene. When utilized at indoor events, however, conversion to employ natural gas is needed instead. Because a minimum of 9–10 pounds psi is required to allow such poppers to then work efficiently, and because the poppers burn oxygen at a very high rate, the operation indoors becomes somewhat dangerous.

SUMMARY OF THE INVENTION

As will become clear from the following description, an improved kettle corn popping structure operates by using an electric heating unit for the corn to pop. With the popping temperature for kettle corn being typically of the order of 460° F., the electric heating unit of the invention will be understood to operate from a 220 v line, in heating the oil into which the kettle corn is added, usually in amounts of 4 pounds at a time.

As will become clear, a corn popping apparatus according to the invention includes a box-like enclosure having upright front, back and side walls, a lid panel for an open top of the enclosure that is tiltable about a top edge of the front wall, and a corn popping kettle that is tiltable with the lid over and beyond the top edge of the front wall in dumping the popped corn therefrom; additionally, and in a preferred embodiment of the invention, the heat source includes an electrically energized resistance unit which is continuous along an underside of the corn popping kettle, and which projects into the enclosure when the lid panel closes the open top of the enclosure. With the electrical resistance unit being secured about the underside of the corn popping kettle—selected of a shape of an elongated sphere—, the electric resistance unit is secured by a heat conducting plate of substantially circular cross-section. With the corn popping kettle then fabricated of a malleable metal and with the heat conducting plate fabricated of stainless steel, for example, the electrical resistance unit becomes capable of heating the underside of the corn popping kettle substantially to this 460° F. temperature. A plurality of brackets will be seen to mechanically connect the heat conducting plate to the underside of the kettle in this arrangement in affording a high degree of protection to the operator—while an on-off switch is built in as a further protective device at an underside of the lid panel in automatically de-energizing the heat source once the lid panel is rotated to open the top of the box-like enclosure.

As with the configurations of my earlier patents, the electrically controlled corn popper apparatus of this invention further includes a receptacle detachably mounted in alignment with the corn popping kettle to receive the popped corn produced, for distribution to the consumers on line. As will be readily understood, such distribution could be directly from this receiving receptacle itself, or, alternatively, could be from a separate hopper into which the popped kettle corn is dumped.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
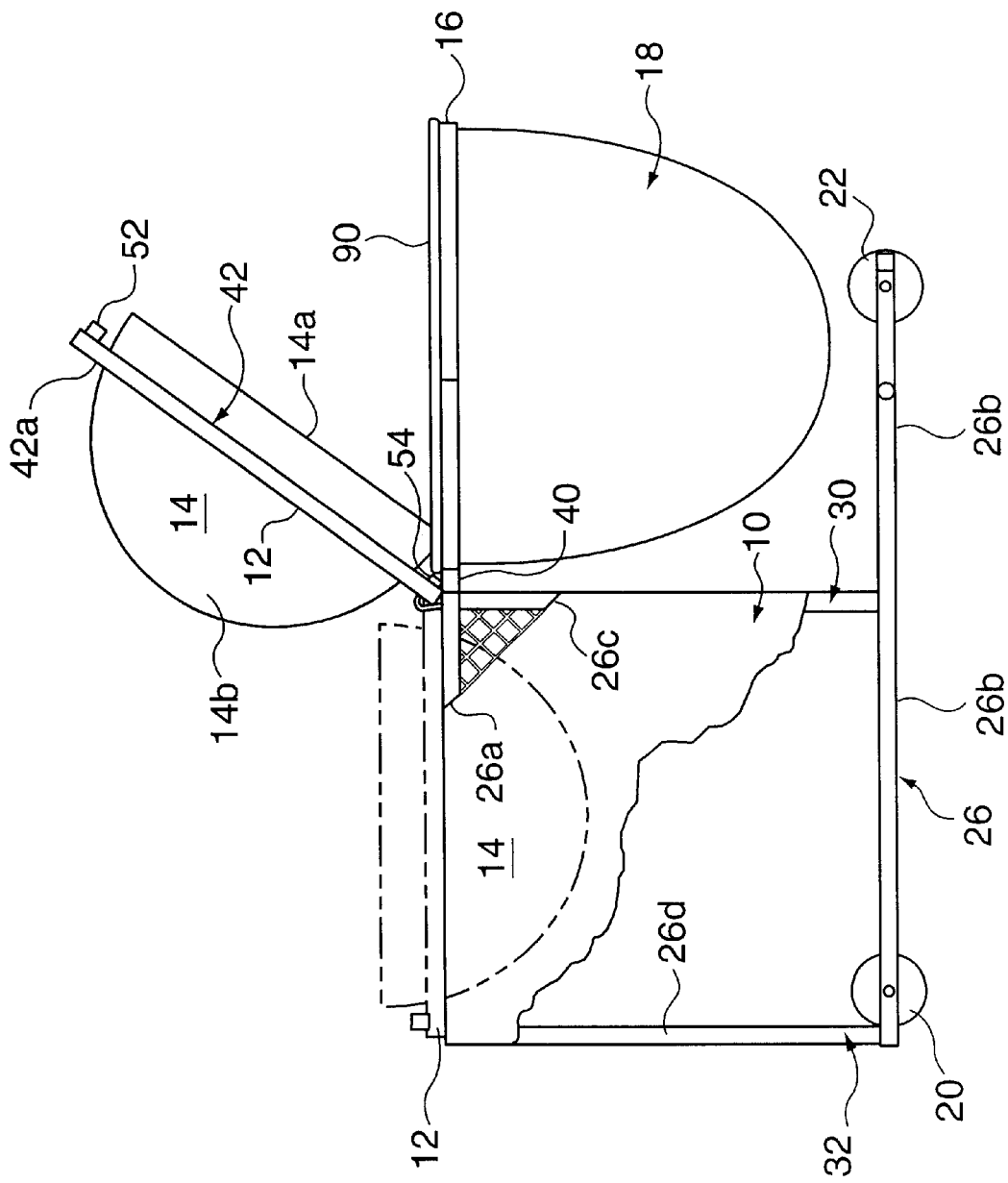
FIG. 1 is a side elevation view of an electrically controlled corn popper apparatus constructed in accordance with the invention.

The corn popper apparatus of the invention includes a cubic cabinet 10 to a top edge of which is mounted a tiltable lid 12 penetrated by the bottom portion of a sizeable corn popping kettle 14 in the shape of an elongated sphere. A bracket 16 is mounted on the cabinet and supports a large holding vessel 18 proximate the front wall of the cabinet as a receptacle to receive the dumped popped corn. Two sets of ground engaging wheels 20 and 22 are attached to the bottom of the cabinet 10 to facilitate movement of the apparatus from place-to-place.

As shown, the cabinet 10 includes an open, box-like enclosure made up of upright, generally square metal frames which provide the right hand side and left hand side respectively of the cabinet 10, and similar frames which provide the front side and rear side in one construction, as best shown at 26, 30 and 32 in FIG. 1 (the left hand side frame 28 understood as being behind the right hand side frame 26 in the drawing). In particular, the top and bottom horizontal members 26*a* and 26*b* of the side frame 26 are welded to the front and rear vertical members 26*c* and 26*d* of the frame— with the other cabinet frames being similar in structure and assembled in any appropriate manner.

As with the constructions of my aforementioned patents, each of the upright frames 26, 28, 30, 32 is covered by a steel sheet or panel welded to the vertical and horizontal tubular members defining each frame. FIG. 1 shows the right hand panel 34. The joined upper members of the side frames 26, 28, 30 and 32—of which only member 26*a* is shown in the drawings—define a top marginal frame for the cabinet 10. To the undersides of these marginal members is attached a transverse top panel 40 similar to the vertical side wall panels covering the sides of the cabinet.

Figure 2:
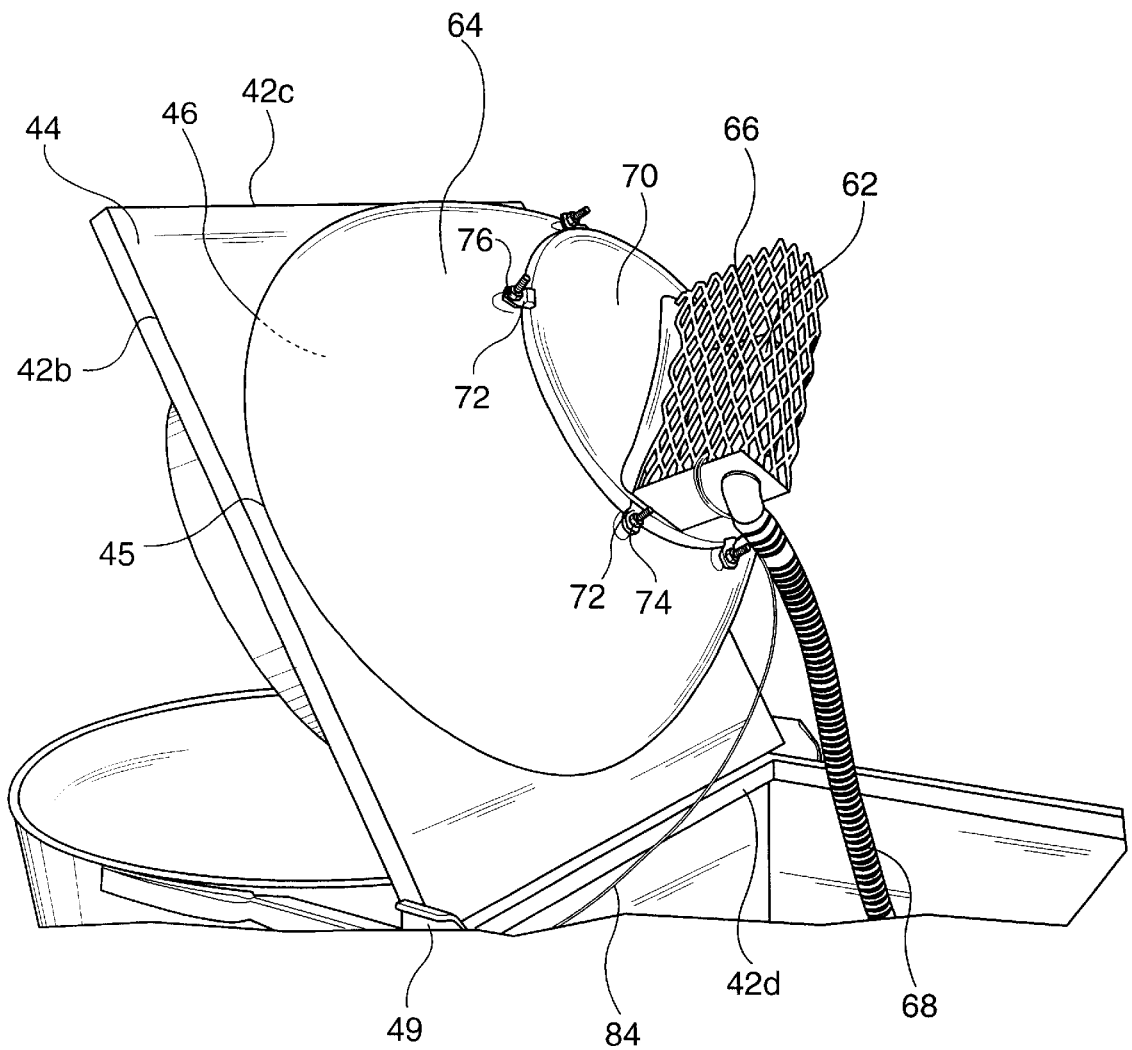
FIG. 2 is a pictorial view showing one manner of securing the electrical resistance heat source unit of the corn popper apparatus.

The lid 12 of the corn popping apparatus of the invention likewise includes a frame 42 corresponding in size and shape to the afore-described frame defining the top of the cabinet 10; and such frame 42 is made up of left and right side members 42*a*, 42*b* and front and rear members 42*c* and 42*d*. Overlying and attached to the upper surfaces of these members is a transverse lid panel 44 having a central aperture 46 through which extends the bottom portion of the kettle 14 (FIG. 2). Such kettle 14 and lid panel 44 are welded together or otherwise attached at their circular line of contact 45 so that the kettle may be tilted with the lid 12 and dumped in the same manner as set out in my U.S. Pat. Nos. 5,857,403 and 6,032,572. The lid 12 is, as there, pivotally hinged at 49 to the cabinet 10 for upward tilting movement about an axis extending longitudinally through the rear frame member 42*d*.

In FIG. 1, the lid 12 and kettle 14 are depicted in their lowered or popping position relative to the cabinet 10 in "phantom lines", and in the tilted or dumping position in "full lines". To manipulate the lid and kettle about pivot 49 to dump or to lower the same, the user may grasp a C-shaped handle 52 attached to the front of the top surface of lid panel 44. To limit the forward pivotal movement of the lid 12 to the desired stop position shown in FIG. 1, a metallic lug 54 may be welded to the upper surface of lid frame 42*d*—again, in the manner as described in my prior patents.

Were a pressurized propane, gasoline or kerosene fuel burner housed within the cabinet 10 below the kettle 14 for heating corn kernels to their popping temperature (typically 460° F.), the corn popping apparatus of the present invention would work perfectly well and be particularly useful at outdoor events and locations. The receiving vessel 18 would have a volumetric capacity great enough for holding several batches of popped corn received from the popping kettle 14. Such vessel is preferably fabricated of metal to give it substantial weight, and when mounted directly upon the wheeled cabinet 10 provides the advantage of easy transportation along with the cabinet. To this end, the vessel 18 is suspended by a circular collar or bracket 16 which underlies and engages the vessel rim 90. The bracket 16 may be rectangular in cross-section, and thin enough to permit it to underlie the rim 90 and to flex somewhat to conform to any irregularities in the vessel wall.

Resort may be had to the disclosures of my U.S. Pat. Nos. 5,857,403 and 6,032,572 patents for a more comprehensive understanding of the manner of moving the corn popping apparatus of the invention about, for the popping of the corn, and for its dumping into the receiving kettle. However, whereas the operation of the apparatus there described works perfectly well, the modification of the present invention enables the popularity of popped kettle corn to be available at indoor events, without the inherent possible problems attendant with heating the corn kernels with pressurized propane, gasoline, kerosene or natural gas.

Figure 3:
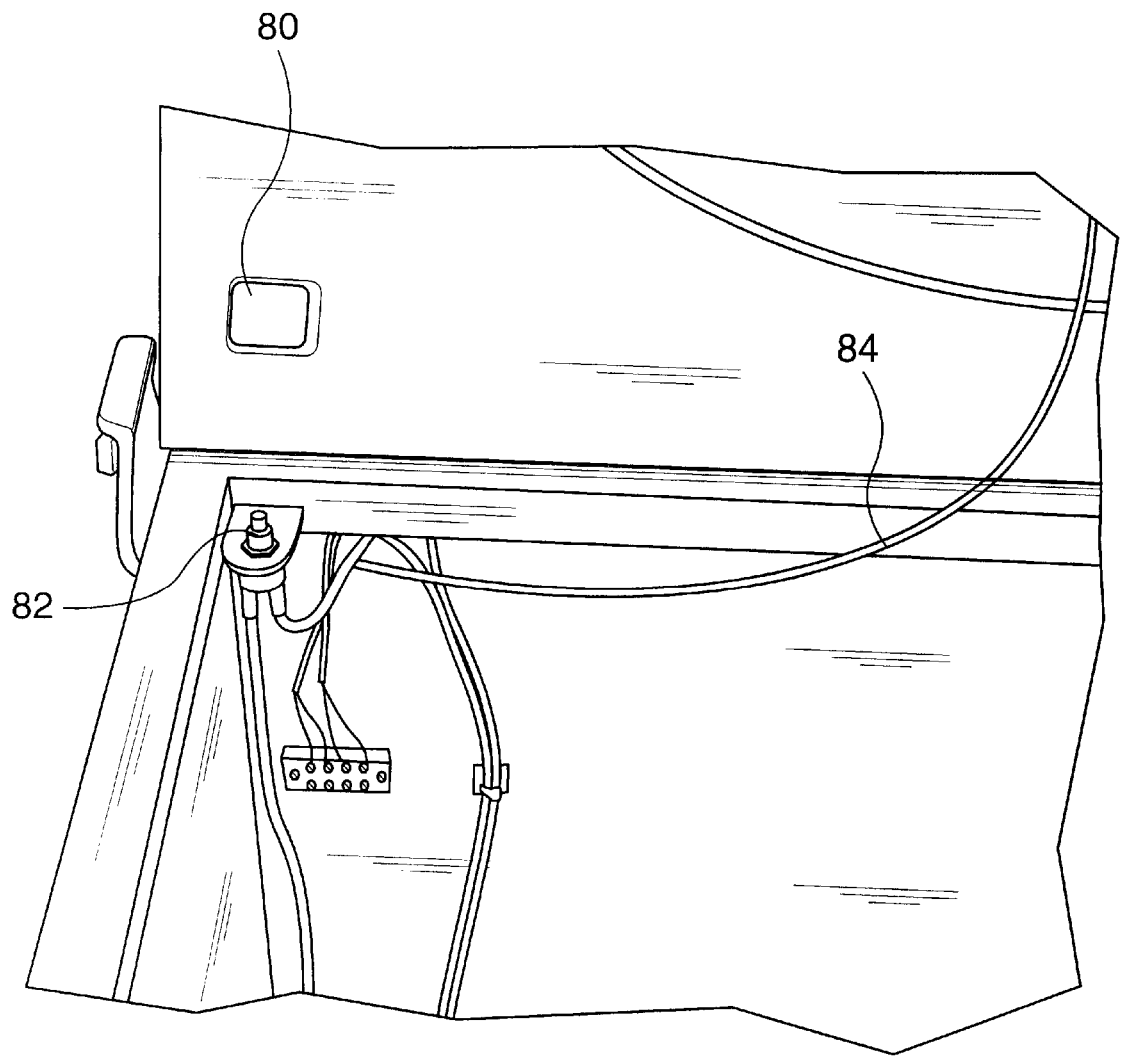
FIG. 3 is an illustrative view of the automatic shut-off switch operative to de-energize the heat source when the lid panel is raised.

Thus, and in accordance with the present invention, rather than employing a fuel burner housed within the cabinet 10 below the kettle 14 for heating the corn kernels, the corn popping apparatus of the present invention employs an electrically energized heat source contiguous along an underside of the corn popping kettle, while projecting into the enclosure when the lid panel 44 closes the open top of the cabinet enclosure. As shown in FIGS. 1 and 2 the heat source includes an electric resistance unit 62 secured about the underside 64 of the corn popping kettle 14. Housed within a protective cage 66, the electric resistance unit 62 is powered by appropriate wire connectors within a cable or conduit 68 joined to an outlet (not shown) and from there to a 220 volt line, for example. With the corn popping kettle 14 still in the shape of an elongated sphere, the electric resistance unit 62 secures to the underside 64 of the kettle 14 by a heat conducting plate 70 of substantially circular cross-section—preferably fabricated of stainless steel, with the kettle 14 fabricated of a malleable metal such as copper. Mounting of the heat conducting plate 70 contiguously along the underside 64 is shown as being by way of a plurality of brackets 72 mechanically connecting the plate 70 to the underside 64 through a series of nuts and bolts 74, 76. A voltage control (not shown) is coupled along the cable or conduit 68 in regulating the temperature of the conducting plate to that at which the oil added to the kettle 14 best heats the corn kernels to their popping temperature, of 460° F. or so. A push-button on-off switch is incorporated at the underside of the lid panel 44 (as in FIG. 3), with oppositely aligned, co-acting components 80, 82 to disconnect the current coupled by the cable or conduit 68 to the conducting plate 70 when the lid panel 44 is raised, in a manner which will be obvious to those acquainted with electrical switch technology. Appropriate wiring in effectuating this is shown at 84.

An appropriate temperature display dial gauge (not shown) is inserted along the cabinet 10 to indicate the temperature of the oil in the kettle 14; once the gauge reaches the temperature at which the corn kernels would pop, the kernels are added to the kettle where they are then stirred. As will be appreciated, without this gauging, the oil temperature could increase beyond its flash point—which is highly undesirable. Controlling the current and the temperature in such manner permits the kernel corn to pop completely in the order of 1½ minutes or so, for ultimate dumping into the receiving receptacle vessel 18, or to a separate hopper.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. A corn popping apparatus including a box-like enclosure having upright front, back and side walls; a lid panel for an open top of said enclosure tiltable about a top edge of said front wall; and a corn popping kettle tiltable with said lid over and beyond said top edge of said front wall to dump popped corn therefrom, wherein the improvement comprises:

an electrically energized heat source contiguous along an underside of said corn popping kettle projecting into said enclosure when said lid panel closes said open top thereof;

wherein said heat source includes an electric resistance unit secured about said corn popping kettle underside; and wherein said corn popping kettle is in the shape of an elongated sphere, and wherein said electric resistance unit secures to said underside of said kettle by a heat conducting plate of substantially circular cross-section.

2. The combination of claim 1 wherein said corn popping kettle is fabricated of a malleable metal and said heat conducting plate fabricated of stainless steel.

3. The combination of claim 1 wherein said electrical resistance unit heats said corn popping kettle underside substantially to a temperature of 460° F.

4. The combination of claim 1, also including a receptacle mounting means detachably securing a receptacle proximate to said enclosure front wall in alignment with said corn popping kettle to receive popped corn dumped therefrom.

5. The combination of claim 1, also including an on-off switch at an underside of said lid panel operative to de-energize said heat source when said lid panel opens said open top of said enclosure.

6. The combination of claim 2, together with mounting means including a plurality of brackets mechanically connecting said heat conducting plate to said underside of said kettle.

* * * * *